Feb. 7, 1939. W. J. BLANCHARD 2,146,522
MOTOR CONTROL SYSTEM
Filed July 30, 1936 2 Sheets-Sheet 1

INVENTOR.
WERNER J. BLANCHARD.

Feb. 7, 1939.  W. J. BLANCHARD  2,146,522
MOTOR CONTROL SYSTEM
Filed July 30, 1936  2 Sheets-Sheet 2

INVENTOR.
WERNER J. BLANCHARD.
BY
ATTORNEY

Patented Feb. 7, 1939

2,146,522

UNITED STATES PATENT OFFICE 2,146,522

MOTOR CONTROL SYSTEM

Werner J. Blanchard, Dayton, Ohio, assignor, by mesne assignments, to Curtiss-Wright Corporation, a corporation of New York Application July 30, 1936, Serial No. 93,383

6 Claims. (Cl. 172—239)

This invention relates to electrical control apparatus and is particularly concerned with a relay switch arrangement by which an electric motor may be caused to stop precisely to prevent or compensate over-running.

A particular type of apparatus in which this invention finds utility is an electrically operated controllable pitch propeller wherein an electric motor carried on the propeller hub is actuated to increase or decrease the pitch of the propeller blades. In such apparatus it is desirable to have a precise control of the propeller blade pitch— the operator may switch on the electric motor to effect a blade pitch change and may turn off the motor when the pitch has been attained. However, the inertia of the high speed motor armature causes it to over-run by which the blade pitch may be increased or decreased, in accordance with the direction in which the motor was operated, to an indeterminate extent to effect a pitch change different from the pitch which was desired. The control system of this invention provides a solenoid switch means by which the electric motor may be stopped at an exact point; or, if the motor over-runs, the control device will automatically reverse the motor, bringing it back to a rotational position at which the propeller blade pitch will be correct.

Although the control device as described in the application is applied particularly to an electrically operated controllable pitch propeller, it may find utility in various other classes of apparatus where precise stopping of an electric motor is a problem.

The control device of the invention is adapted to be used with a controllable pitch propeller of the type disclosed in my Patent No. 1,951,320, issued March 13, 1934. The control device is also adapted to be used in conjunction with the control apparatus and indicator shown in my Patent No. 1,958,261, issued May 8, 1934. A propeller pitch indicator is also shown in my copending application No. 750,256, filed October 27, 1934, and the control device of the subject invention may also be organized to operate in connection with said pitch indicator of the above mentioned application.

Briefly, the control device comprises a solenoid operated switch, certain of the solenoids being energizable to close a main switch which establishes the circuit to the propeller motor. The propeller blade and motor organization includes a circuit closing arrangement which operates at a frequency proportional to the motor revolutions. This circuit closing is coordinated with the solenoid switch, so that after the main motor circuit has been broken, if the motor over-runs to a point where the circuit closer is closed, a reverse motor actuating circuit is closed reversing the motor to cause its movement to such a point that the circuit closer is caused to open.

Objects of the invention are to provide a solenoid control device for preventing over-running of an electric motor; to provide a relay switch organization which may be coordinated with existing types of switches and motors, so that the motor may be precisely controlled; and to provide a compact, relatively reasonably priced relay switch which serves not only as a main relay control for an electric motor, but serves also to precisely control stoppage of the electric motor at some desired point. Further objects of the invention will become apparent in reading the annexed specification and claims, and in viewing the drawings in which:

Figure 6:
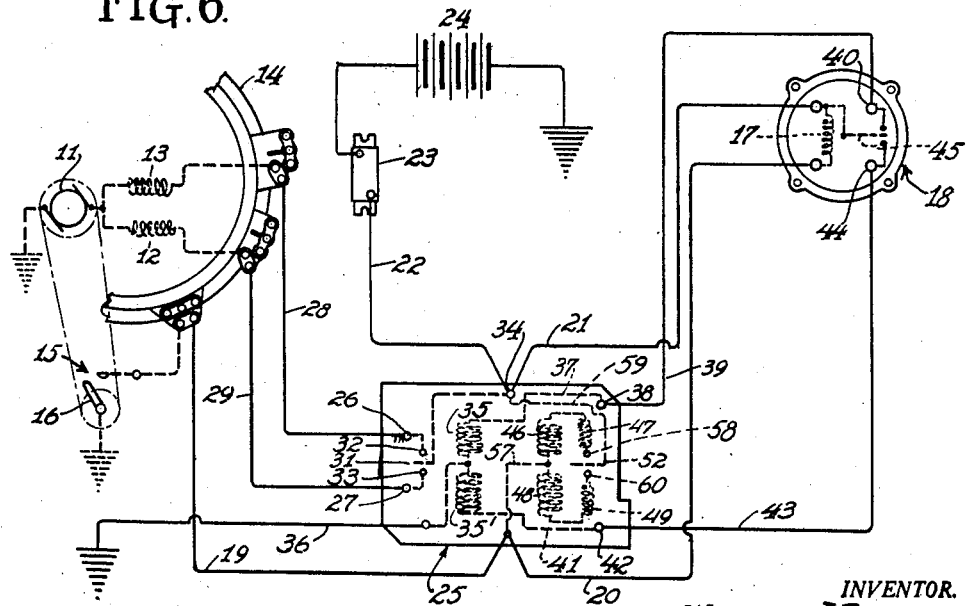
Fig. 6 is a wire diagram of the relay switch and the associated apparatus with which it is adapted to be used.

Referring first to Figure 6, I show diagrammatically a motor 11 having forward and reverse field windings 12 and 13 respectively, connected to a slipring organization 14 arranged in a manner which is well known in the art, between the propeller and an engine casing. In the embodiment here adapted, the motor with its field windings turns as a unit with an aeronautical propeller (not shown) which is provided in a well known manner with blades rotatable about their own axes, the blades being so turned by rotation of the armature of the motor 11 with respect to the propeller hub. The propeller also includes a circuit closer 15, the blade 16 of which is arranged to turn at a speed proportional to that of the motor armature. In actual practice, this circuit closer switch is arranged to close a circuit at every ⅓° pitch change of the propeller blades, and the circuit closer is arranged to operate a propeller pitch indicator, the actuating device of which is a solenoid 17 forming part of the combined propeller pitch control and indicating unit 18. This unit 18 in itself forms no part of the present invention, but is substantially identical with that disclosed in the above mentioned Patent No. 1,958,261.

Connection from the circuit closer 15 to the indicator is made through wires 19 and 20, while connection from the indicator to a power source is made through the wires 21 and 22, through a fuse 23 to a battery 24, and thence to ground.

Figure 5:
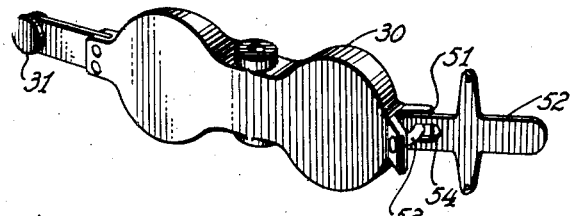
Fig. 5 is a detailed perspective view of the armature of the instrument.

The relay switch is designated in its entirety as 25, the switch being provided with terminals 26 and 27 connected respectively through wires 28 and 29 to the motor field windings 13 and 12. The unit 25 carries a pivoted armature 30 as shown in Figure 5 which is provided with a contact piece 31 which may be selectively contacted with contact pieces 32 or 33 connected respectively to the terminals 26 and 27. The armature 30 is connected at the terminal 34 to the wire 22. By the organization so far described it will be apparent that if the contact piece 31 is moved into contact with 32 the field windings 13 of the motor are energized by which the motor is caused to operate. Contrarily, if the contact piece 31 touches the contact piece 33 the field winding 12 is energized.

The device 25 is provided with solenoids 35 and 35', either of which, when energized, cause the aforementioned movement of the armature 30. The solenoids 35 and 35' have a common connection 36 which is grounded. The solenoid 35 at its other end is connected through a wire 37, terminal 38 and wire 39, to a terminal 40 in the control instrument 18. Similarly, the solenoid 35' is connected through a wire 41, terminal 42, and wire 43 to a terminal 44 in the instrument 18. Manual manipulation of a control arm 45 in the instrument 18, the arm being connected to the power source through the wire 21, will cause current to be selectively directed to either the solenoids 35 or 35', to operate the motor. Thus far, the apparatus comprises a simple relay switch arrangement.

Figure 1:
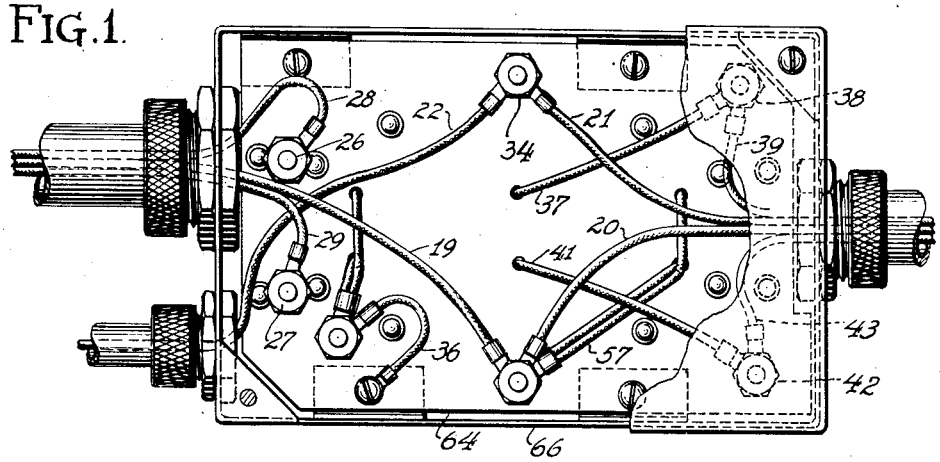
Fig. 1 is a plan view, with the cover broken away, showing the physical wiring arrangement of the relay switch.
Figure 2:
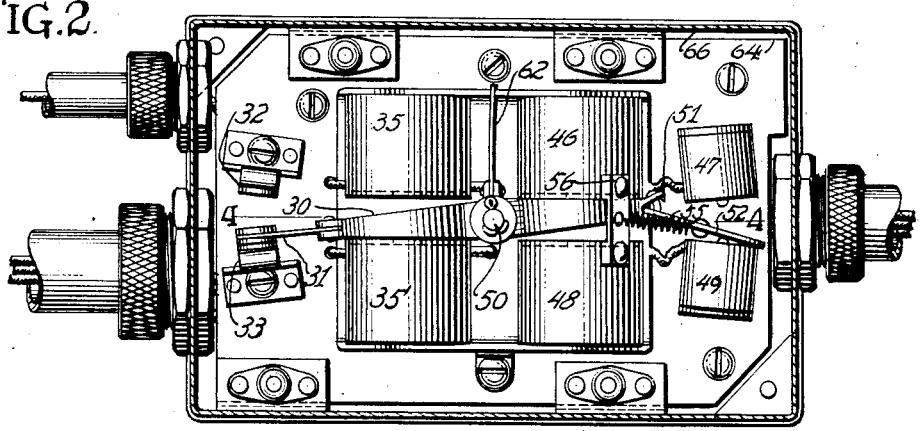
Fig. 2 is an inverted plan, with the cover removed, showing the solenoid organization.
Figure 3:
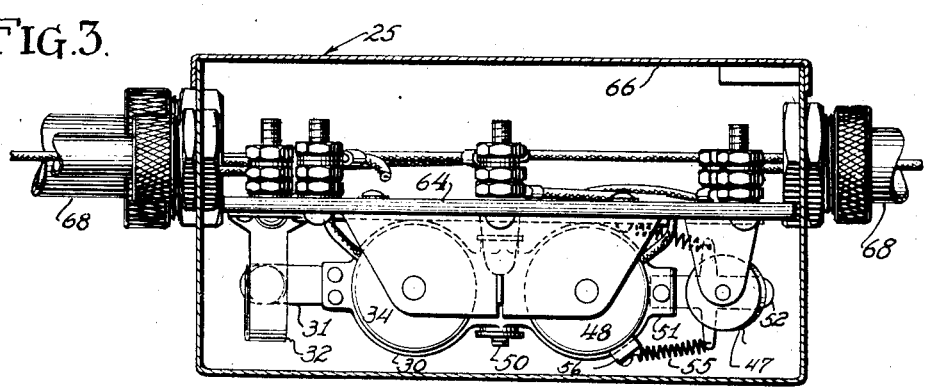
Fig. 3 is a side elevation of the relay switch, with its case in section.
Figure 4:
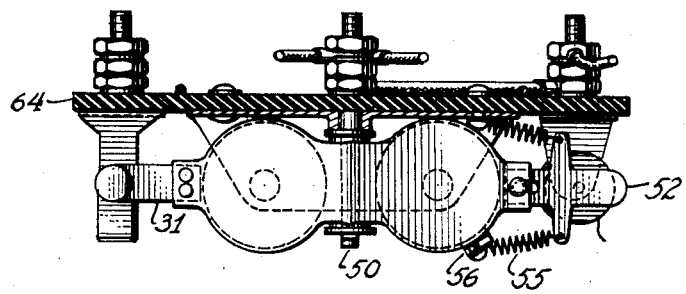
Fig. 4 is a section on the line 4—4 of Fig. 2.

The device 25 includes solenoids 46 and 47, connected in series, and solenoids 48 and 49, also connected in series. As will be seen in Figure 2, the armature 30 is pivoted for swinging substantially at the center of the four solenoids 35, 35', 46 and 48 in such a way that the solenoids 46 or 48 may act upon the armature 30 to cause contact of the piece 31 with either the piece 33 or the piece 32. The armature is notched at its right hand end, and an auxiliary armature 52 is arranged in the notch for swinging. The armature 52 is held against the armature 30 by means of a pin 53 engaging a slot 54 in the armature 52, and springs 55 are connected between ears on the armature 52 to suitable clips 56 in the cases of the solenoids 46 and 48. The auxiliary armature 52 by this arrangement will slap from side to side as the armature 30 is moved about its pivot 50. When pieces 31 and 33 are in contact, the auxiliary armature 52 will be snapped against the small solenoid 49 which incorporates a switch as will later be described. Similarly, if the pieces 31 and 32 are in contact, the auxiliary armature 52 will be snapped against the solenoid 47 which also includes a switch.

Referring again to the wiring diagram of Figure 6, it will be noted that the solenoids 46 and 48 have a connection 57 leading through the wire 19 to the current closer 15. The solenoids 46 and 47 are connected in series, the free end of the windings of the solenoid 47 terminating in a switch point 58, which is at times contacted by the auxiliary armature 52, as above described. This auxiliary armature is connected through a wire 59 to the terminal 34 which in turn is connected to the battery. The solenoids 48 and 49 are connected in series, the end of the winding of the solenoid 49 terminating in a contact 60 which, at times, is engaged by the auxiliary armature 52.

The operation of the relay switch 25 is as follows: Initiation of operation of the motor 11 is effected by means of the control arm 45, actuating the solenoids 35 or 35' to close the contact pieces 31 and 32 or 31 and 33 to energize the motor. So long as the solenoids 35 or 35' are active the armature 30 will be attracted close to one or the other. As the motor operates, the circuit closer 15 will operate intermittently to energize the indicator portion 17 of the control device 18, and simultaneously to energize either set of solenoids 46, 47 or 48, 49 in accordance with whichever switch point 58 or 60 the auxiliary armature 52 engages. This periodic actuation of the solenoid sets 46, 47 or 48, 49 will have no effect on the primary motor control circuit, while said circuit is active. This will be clear by referring to Figure 2. If the solenoid 35' has been energized, the armature 30 will touch the solenoid as shown; thus the auxiliary armature 52 addresses the solenoid 49, by which the solenoids 48 and 49 are energized periodically as the circuit closer 15 operates. The magnetic field of the solenoid 48, due to the air gap between it and the armature 30, will have no effect in moving the armature, since the later is frozen to the solenoid 35'. However, when the solenoid 35' is de-energized, and the motor switch broken by virtue of the operation of a centralizing spring 62, which serves to centralize the armature, the solenoids 48 and 49 are still in such a condition that they may be energized by the circuit closer 15 if the latter is operated by undue over-running of the motor armature 11. When the circuit closer 15 does so operate, the solenoids 48 and 49 will be energized, the solenoid 48 attracting the armature 30 and closing the primary motor circuit for reverse operation by contact of the pieces 31 and 32. The solenoid 49 will continue to hold the auxiliary armature 52 to hold the solenoids 48 and 49 active, but as soon as the circuit closer 15 opens, by virtue of reverse motor rotation, the auxiliary armature 52 will snap away from the solenoid 49, the solenoid circuit will be broken, and the motor circuit will be opened by the centralization of the piece 31.

Alternate reverse operations of the motor, after the primary solenoids 35 or 35' have been de-energized, may occur so long as the circuit closer 15 is in a circuit closing position, due to motor over-run. Just as soon as this switch breaks, and the motor stops in a position where the circuit closer 15 is open, the apparatus becomes inert and may not again function until the control arm 45 of the control device 18 has purposely been moved to start the electric motor.

In the actual embodiment of the relay switch 25, the several solenoids and switch point components are mounted upon an insulating piece 64 which is contained within a metallic box 66 for protection. The several electrical connections for the relay switch 25 are carried thereto in conduits 68 of conventional type.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a control device for a motor, in combination, an intermittent circuit closer associated with the motor dependent in its intermittent circuit closing on operation of the motor, a motor control circuit, a manual control switch therein for controlling energization and de-energization of the motor, said motor being subject to overrun upon de-energization thereof, and a reversing switch in said motor control circuit operated only by intermittent operation of said circuit closer after opening of said control switch and over-run of said motor for reversing the energization of the motor to stop over-run thereof.

2. In a control system for a reversible electric motor, a circuit closer driven by and closable in proportion to the turns made by said motor, a switch for energizing said motor for forward or reverse operation, primary selectively operable means for actuating said switch, a secondary means for operating said switch comprising solenoids, and a control switch operated by main switch movement in series with said circuit closer for energizing one or another of said solenoids to effect reverse or forward closure of the primary switch respectively after selective opening thereof, due to motor overrun.

4. In a control system for an electric motor, means to energize the motor and to prevent undue overrunning thereof comprising in combination; a mechanical circuit closer actuated intermittently in proportion to the turns made by and during operation of the motor; a switch initially closable to energize said motor for rotation, a main solenoid energizable to actuate the switch for one direction of rotation of the motor; and another solenoid means energizable to actuate the switch for reverse motor rotation, in circuit with said circuit closer, operative upon closure of said closer due to motor overrun after the main solenoid is deenergized and the switch opened, to reversely close the switch and to energize the motor for reverse rotation.

4. In a control system for an electric motor, a selectively operable reversible main motor circuit switch for energizing the motor for forward or reverse rotation; a control circuit, a periodic circuit closer therein driven by the motor and proportional in its closing to motor revolutions, and a solenoid in said control circuit magnetically associated with said switch and in circuit with said circuit closer, said solenoid, after selective opening of the switch, being energized by closing of the closer due to motor overrun and, by its magnetic association with the main switch, closing the switch in a motor reversing position.

5. In a control system for a reversible electric motor, a selectively operable main reversing switch therefor; a control switch having reversing and forward contact positions mechanically closed in reversing and forward positions respectively by and in response to forward and reverse main switch operation, said control switch including means for maintaining the reverse or forward closure thereof after main switch opening, reversing and forward solenoids respectively connected to the reversing and forward control switch contacts, the solenoids being magnetically related to the main switch, and a circuit closer intermittently operable in response to motor rotation in circuit with the solenoids and control switch, whereby one of said solenoids, upon energization by the closer after main switch opening and motor overrun, moves said main switch by its magnetic relation therewith to effect opposite motor rotation to back off said overrun.

6. In a control system for an electric motor, forward and reverse motor energizing circuits, a main switch selectively operable to close one or the other of said circuits; forward and reverse control circuits, an auxiliary switch mechanically operated by said main switch to preselect the opposite of said control circuits from that motor circuit which the main switch closes, a solenoid in each control circuit, each solenoid being positioned to act magnetically upon the main switch, and a circuit closer operated intermittently in response to motor rotation for energizing that control circuit and the solenoid therein as preselected by said auxiliary switch.

WERNER J. BLANCHARD.